US011652903B2

(12) United States Patent
Chen et al.

(10) Patent No.: US 11,652,903 B2
(45) Date of Patent: May 16, 2023

(54) METHOD AND SYSTEM FOR STREAMING APPLICATIONS USING RATE PACING AND MPD FRAGMENTING

(71) Applicant: MediaTek Inc., Hsin-Chu (TW)

(72) Inventors: Lulin Chen, San Jose, CA (US); Shan Liu, San Jose, CA (US); Wang Lin Lai, San Jose, CA (US)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 17/550,970

(22) Filed: Dec. 14, 2021

(65) Prior Publication Data

US 2022/0109737 A1 Apr. 7, 2022

Related U.S. Application Data

(62) Division of application No. 16/072,908, filed as application No. PCT/CN2017/071820 on Jan. 20, 2017, now Pat. No. 11,233,868.

(Continued)

(51) Int. Cl.
*H04L 67/55* (2022.01)
*H04L 65/80* (2022.01)
(Continued)

(52) U.S. Cl.
CPC ............ *H04L 67/55* (2022.05); *H04L 65/612* (2022.05); *H04L 65/80* (2013.01); *H04L 67/02* (2013.01)

(58) Field of Classification Search
CPC ....... H04L 67/55; H04L 65/612; H04L 65/80; H04L 67/02
See application file for complete search history.

(56) References Cited

U.S. PATENT DOCUMENTS 11,233,868 B2   1/2022  Chen et al.
2014/0219230 A1  8/2014  Schierl et al.
(Continued)

FOREIGN PATENT DOCUMENTS

TW          201349870 A    12/2013
WO    WO 2015/004276 A2    1/2015
(Continued)

OTHER PUBLICATIONS

U.S. Appl. No. 16/072,908, filed Jul. 26, 2018, Chen et al.
(Continued)

*Primary Examiner* — Kyu Chae
(74) *Attorney, Agent, or Firm* — Wolf, Greenfield & Sacks, P.C.

(57) ABSTRACT

A method and system of multimedia streaming services using DASH (Dynamic Adaptive Streaming over HTTP) are disclosed. According to this method, one or more Push Directives are sent from a client to a server to indicate information related to media data requested. Each Push Directive comprises a Push type including Push-rate and Push-rate Directive includes information associated with a push data rate related to the media data requested. If the Push-rate Directive is received by the server, one or more groups of data for the media data requested are pushed from the server to the client according to the push data rate. According to another method, fragmented MPDS are used, where at least one fragmented MPD omits a MPD header, MPD payload, Period header or Period payload. In yet another method, a status message group includes SharedResourceAllocation message that comprises parameters including bandwidth and pacingRate.

2 Claims, 7 Drawing Sheets

Related U.S. Application Data

(60) Provisional application No. 62/347,396, filed on Jun. 8, 2016, provisional application No. 62/291,027, filed on Feb. 4, 2016, provisional application No. 62/287,929, filed on Jan. 28, 2016.

(51) Int. Cl.
   *H04L 67/02* (2022.01)
   *H04L 65/612* (2022.01)

(56) References Cited

U.S. PATENT DOCUMENTS

| | | | |
|---|---|---|---|
| 2016/0198012 A1* | 7/2016 | Fablet | H04L 67/55 709/231 |
| 2018/0139254 A1* | 5/2018 | Oyman | H04N 21/23439 |
| 2021/0105333 A1 | 4/2021 | Chen et al. | |

FOREIGN PATENT DOCUMENTS

| | | |
|---|---|---|
| WO | WO 2015/105377 A1 | 7/2015 |
| WO | WO 2015/189159 A1 | 12/2015 |

OTHER PUBLICATIONS

PCT/CN2017/071820, Apr. 18, 2017, International Search Report and Written Opinion.

International Search Report and Written Opinion for International Application No. PCT/CN2017/071820 dated Apr. 18, 2017.

[No Author Listed], ISO/IEC Information technology—Dynamic adaptive streaming over HTTP (DASH)—Part 1: Media presentation description and segment formats. May 2014. 152 pages.

Denoual et al., International Organisation for Standardisation. ISO/IEC Coding of Moving Pictures and Audio. MPEG2015/M37248. Editorial comments on DASH FDH Working draft. Oct. 2015. 15 pages.

* cited by examiner

```
<?xml version="1.0" encoding="UTF-8"?>
<MPD xmlns:xsi="http://www.w3.org/2001/XMLSchema-instance"
xsi:schemaLocation="urn:mpeg:DASH:schema:MPD:2011 DASH-MPD.xsd"
xmlns="urn:mpeg:DASH:schema:MPD:2011"
id="ActionMovie"
type="static"
mediaPresentationDuration="PT6158S"
minBufferTime="PT1.4S"
profiles="urn:mpeg:dash:profile:mp2t-simple:2011"
maxSegmentDuration="PT4S">                                                    } 310
    <Period id="Movie_01" duration="PT1800S">
        <BaseURL>http://cdn1.example.com/</BaseURL>                           } 320
        <BaseURL>http://cdn2.example.com/</BaseURL>
        <AdaptationSet id="Movie_video">
            <SegmentTemplate
              media="$RepresentationID$_$Number%05d$.ts?poid=88a8c32d8"
              index="$RepresentationID$.sidx"
              bitstreamSwitching="$RepresentationID$-bssw.ts"
              duration="4" startNumber="450"/>
            <Representation id="720kbps" bandwidth="792000" width="640" height="368" >
              <SubRepresentation level="0" contentComponent="481" maxPlayoutRate="32"/>
              <SubRepresentation level="1" contentComponent="481" maxPlayoutRate="4"
                 dependencyLevel="0"/>
              <SegmentBase timescale="90000" presentationTimeOffset="162000000" />
            </Representation>
            <Representation id="1130kbps" bandwidth="1243000" width="704" height="400">
              <SubRepresentation level="0" contentComponent="481" maxPlayoutRate="32"/>
              <SubRepresentation level="1" contentComponent="481" maxPlayoutRate="4"
                 dependencyLevel="0"/>
              <SegmentBase timescale="90000" presentationTimeOffset="162000000" />
            </Representation>
        </AdaptationSet>
    </Period>
</MPD>
```

Fig. 3

```
<?xml version="1.0" encoding="UTF-8"?>
<MPD xmlns:xsi="http://www.w3.org/2001/XMLSchema-instance"
xsi:schemaLocation="urn:mpeg:DASH:schema:MPD:2011 DASH-MPD.xsd"
xmlns="urn:mpeg:DASH:schema:MPD:2011"
id=" ActionMovie"
type="static"
mediaPresentationDuration="PT6158S"
minBufferTime="PT1.4S"
profiles="urn:mpeg:dash:profile:mp2t-simple:2011"
maxSegmentDuration="PT4S">
    <Period>
    </Period>
</MPD>
```

Fig. 4

```xml
<?xml version="1.0" encoding="UTF-8"?>
<MPD id=" ActionMovie" >
   <Period id="Movie_01" duration="PT1800S">
     <BaseURL>http://cdn1.example.com/</BaseURL>
     <BaseURL>http://cdn2.example.com/</BaseURL>
     <AdaptationSet id="Movie_video">
       <SegmentTemplate
          media="$RepresentationID$_$Number%05d$.ts?poid=88a8c32d8"
          index="$RepresentationID$.sidx"
          bitstreamSwitching="$RepresentationID$-bssw.ts"
          duration="4" startNumber="450"/>
       <Representation id="720kbps" bandwidth="792000" width="640" height="368" >
         <SubRepresentation level= "0" contentComponent="481" maxPlayoutRate="32"/>
         <SubRepresentation level= "1" contentComponent="481" maxPlayoutRate="4"
            dependencyLevel= "0" />
         <SegmentBase timescale="90000" presentationTimeOffset="162000000" />
       </Representation>
       <Representation id="1130kbps" bandwidth="1243000" width="704" height="400">
         <SubRepresentation level= "0" contentComponent="481" maxPlayoutRate="32"/>
         <SubRepresentation level= "1" contentComponent="481" maxPlayoutRate="4"
            dependencyLevel= "0" />
         <SegmentBase timescale="90000" presentationTimeOffset="162000000" />
     </AdaptationSet>
   </Period>
</MPD>
```

Fig. 5

```xml
<?xml version="1.0" encoding="UTF-8"?>
<MPD id=" ActionMovie" >
   <Period id="Movie_01" duration="PT1800S">
     <BaseURL>http://cdn1.example.com/</BaseURL>
     <BaseURL>http://cdn2.example.com/</BaseURL>
   </Period>
</MPD>
```

Fig. 6

```
<?xml version="1.0" encoding="UTF-8"?>
<MPD id=" ActionMovie" >
  <Period id="Movie_01" duration="PT1800S">
    <AdaptationSet id="Movie_video">
      <SegmentTemplate
         media="$RepresentationID$_$Number%05d$.ts?poid=88a8c32d8"
         index="$RepresentationID$.sidx"
         bitstreamSwitching="$RepresentationID$-bssw.ts"
         duration="4" startNumber="450"/>
      <Representation id="720kbps" bandwidth="792000" width="640" height="368" >
         <SubRepresentation level= "0" contentComponent="481" maxPlayoutRate="32"/>
         <SubRepresentation level= "1" contentComponent="481" maxPlayoutRate="4"
            dependencyLevel= "0" />
         <SegmentBase timescale="90000" presentationTimeOffset="162000000" />
      </Representation>
      <Representation id="1130kbps" bandwidth="1243000" width="704" height="400">
         <SubRepresentation level= "0" contentComponent="481" maxPlayoutRate="32"/>
         <SubRepresentation level= "1" contentComponent="481" maxPlayoutRate="4"
            dependencyLevel= "0" />
         <SegmentBase timescale="90000" presentationTimeOffset="162000000" />
    </AdaptationSet>
  </Period>
</MPD>
```

Fig. 7

METHOD AND SYSTEM FOR STREAMING APPLICATIONS USING RATE PACING AND MPD FRAGMENTING

CROSS REFERENCE TO RELATED APPLICATIONS

This Application is a divisional application of U.S. application Ser. No. 16/072,908, filed Jul. 26, 2018, entitled "METHOD AND SYSTEM FOR STREAMING APPLICATIONS USING RATE PACING AND MPD FRAGMENTING", which is a national stage filing under 35 U.S.C. § 371 of International Patent Application Serial No. PCT/CN2017/071820, filed Jan. 20, 2017, entitled "METHOD AND SYSTEM FOR STREAMING APPLICATIONS USING RATE PACING AND MPD FRAGMENTING", which claims priority to U.S. Provisional Patent Application, Ser. No. 62/287,929, filed on Jan. 28, 2016, U.S. Provisional Patent Application, Ser. No. 62/291,027, filed on Feb. 4, 2016 and U.S. Provisional Patent Application, Ser. No. 62/347,396, filed on Jun. 8, 2016. The entire contents of these Applications are hereby incorporated herein by reference in their entireties.

TECHNICAL FIELD

The present invention relates to media streaming over Internet. In particular, the present invention relates to methods and systems to improve network efficiency and/or quality of service related to media streaming.

BACKGROUND

HyperText Transfer Protocol (HTTP) is a set of standards that allow users of the World Wide Web to exchange information found on web pages. It has been de facto standard for Internet access today. Browsers from various developers all support the HTTP as the communication protocol to connect a client to Web servers on the Internet. Through HTTP, a connection between a user and a server can be established so that HTML (HyperTextMarkup Language) pages can be sent to the user's browser. The protocol can also be used to download files from the server either to the browser or to any other requesting application that uses the HTTP.

In recent years, video streaming over Internet has been an important application. Today, video streaming contributes to the most Internet traffic. Various multimedia streaming protocols have been widely used and some of the protocols are based on the HTTP. Dynamic Adaptive Streaming over HTTP (DASH), also known as MPEG-DASH, is an adaptive bitrate streaming technique that enables media content delivery over the Internet based on the conventional HTTP web servers.

According to HTTP 1.1 (R. Fielding, et al., "Hypertext Transfer Protocol HTTP/1.1", IETF (Internet Engineering Task Force) RFC 2616, June 1999), web service is disclosed as a paired request/response data flow and client/server model based application. The DASH streaming with HTTP 1.1 is in the same spirit, which means that a DASH client issues a MPD/segment request to a DASH server, the DASH server sends back the requested MPD/segment as a response. Multiple responses are corresponding to multiple requests and no responses if no requests. According to DASH, Media Presentation Description (MPD) is formalized description for a Media Presentation for the purpose of providing a streaming service.

HTTP server push is supported in HTTP/2 (M. Belshe, et al., "Hypertext Transfer Protocol Version 2 (HTTP/2)", IETF (Internet Engineering Task Force) RFC 7540, May 2015) or HTTP 1.1 with WebSocket (I. Fette, et al., "*The WebSocket Protocol*", IETF RFC 6455, December 2011) upgrade. The mechanism is that server can send unsolicited data to a client. Technically, this means that a single request could receive multiple responses.

The MPEG DASH standard (i.e., the ISO/IEC 23009 family) has evolved to its 2nd edition for Part 1 of ISO/IEC 23009-1 ("*Dynamic adaptive streaming over HTTP (DASH)—Part 1: Media presentation description and segment formats*", ISO/IEC 23009-1, May 2014). Currently, the 3rd edition of Part 1 is under working. The standard specifies Media Presentation Description (MPD) and media segment format. For the DASH streaming service, usually an authored content has a corresponding MPD file to be associated with. A DASH client requests a MPD file first for the contents that the client intends to consume and then requests media segments based on the description in the MPD. Such a request/response model is the essential part for today's streaming applications. Part 6 of the DASH standard—DASH over Full Duplex HTTP-compatible Protocols (FDH) has issued the third version of the working draft ("*Working Draft for 23009-6: DASH over Full Duplex HTTP-compatible Protocols (FDH)*", N15685, October 2015, Geneva, Switzerland). Part 6 of ISO/IEC 23009 specifies carriage of MPEG-DASH media presentations over full duplex HTTP-compatible protocols, particularly HTTP/2 and Web Socket.

In the working draft, several push directives have been defined for messaging between client and server to support HTTP server push for DASH streaming applications. The overall flow of video streaming using server push is shown in FIG. 1. A set of communication procedures are used between the server and the client to facilitate media streaming. As shown in FIG. 1, at the client side 110, the client requests MPD in step 111, which includes MPD URL (Uniform Resource Locator) and Push Directive. At web server side 120, server receives the MPD request in step 121 and sends MPD in step 122, which includes Push acknowledgement and MPD. The client receives the new MPD in step 112. The server also sends initialization data in step 123 and the client receives the initialization data in step 113. The client then requests segment in step 114, which includes segment URL and Push Directive. The server receives the segment request in step 124 and sends segments in step 125, which includes Push acknowledgement followed by segments. The client receives the new segments in step 115 and plays video based on the received segments in step 116. The client may request more segments by going back to step 114 to form a loop.

A Push Directive signals the push strategy that a client would like the server to use for delivery of one or more future segments. A Push Directive has a type followed by parameters associated with it. The current Push types include: Push-next, Push-time, Push-template, and Push-none.

A MPD may have a type of "static" or "dynamic", the static type is typically for use with on-demand streaming services that the static MPD is a description for the whole relevant content. One time fetching of MPD works for requesting a full length of content if the client choose to consume. The dynamic type is used for live streaming services that dynamic MPD may be a progressed description for a live content with a required update along with the event timeline. A client, in this case, needs to request periodically the updated version of MPD in order to continue the representation playout since the updated MPD may consist of future content descriptions. The representation corresponds to a collection and encapsulation of one or more media streams in a delivery format and associated with descriptive metadata.

Generally, a MPD file consists of hierarchical parts such as basic MPD settings, Period, Adaptation Set, Representation, and Segment in order to support adaptive streaming services. Upon receiving a MPD, a DASH client may select media content segments described in the MPD with a given timeline, given IDs of Representation, Adaptation Set, and Period in terms of personal preference and network dynamics. The segment URL in MPD may be in a form of SegmentList and/or SegmentTemplate with SegmentBase and BaseURL. A MPD file size may vary with the number of Periods in a MPD, the number of Adaptation Sets in a Period, the number of Representations in an Adaptation Set, and the number of Segments in a Representation ultimately. The bigger those numbers, the larger MPD file size. However, there may have a reasonable size of a MPD file when the segment URL can be expressed with SegmentTemplate, i.e., in $Time$ or $Number$ as specified in the standard. Note using SegmentList only may generate a large size of a MPD file, e.g., for a two-hour movie content. In practice, the following may be desired or required to have with a MPD when providing a better adaptive streaming service.

Multiple of Periods
More Adaptation Sets
More Representations
Smaller size of Segments
Editing and Content/Ad insertion friendly
Controlled playback and enforcement The DASH standard on server and network assisted DASH (SAND) ("Text of ISO/IEC FDIS 23009-5 Server and Network Assisted DASH", w16230, June 2016, Geneva, Switzerland) introduces messages between DASH clients and network elements or between various network elements for the purpose to improve efficiency of streaming sessions. In order to enhance the delivery of DASH content, the SAND messages provide information about real-time operational characteristics of networks, servers, proxies, caches, CDNs (Content Delivery Networks) as well as DASH client's performance and status. In the SAND framework, four types of messages are defined as below for exchanging between DASH client and DANE (DASH Aware Network Element).

Parameters Enhancing Delivery (PED) messages that are exchanged between DANEs,
Parameters Enhancing Reception (PER) messages that are sent from DANEs to DASH clients,
Status messages that are sent from DASH clients to DANEs,
Metrics messages that are sent from DASH clients to Metrics servers.

FIG. 2 illustrates an example of message exchange between DASH client (220) and DANEs (210 and 212). The system also includes a metrics server (230). The messages and the flow directions are indicated.

SUMMARY

A method and system of message exchange for controlling flow associated with multimedia streaming services from a server to a client using DASH (Dynamic Adaptive Streaming over HTTP (Hypertext Transfer Protocol)) are disclosed. According to this method, one or more Push Directives are sent from a client to a server to indicate information related to media data requested. Each Push Directive comprises a Push type selected from a Push type group including Push-rate, and a Push-rate Directive is the Push Directive selecting the Push-rate as the Push type and the Push-rate Directive includes information associated with a push data rate related to the media data requested. If the Push-rate Directive is received by the server, one or more groups of data for the media data requested are pushed from the server to the client according to the push data rate. The groups of data for the media data received are then played back said one or more by the client.

The Push-rate may correspond to urn:mpeg:dash:fdh: 2016:push-rate. Each Push Directive further comprises a parameter and the parameter for the Push-rate corresponds to Rate R to indicate the push data rate related to the media data requested. If the Rate R is not present or has a value of zero, the server pushes the media data requested according to network protocol settings. If a range is specified by Push-time, Push-next, or Push-template Directive and representation switching is indicated in the range, a currently requested content data rate $R_d$ is set to a maximum data rate of corresponding representations in the range. The server may push the groups of data for the media data requested to the client at a selected data rate no less than the Rate R. If the Push-rate Directive is used with a content component associated with a MPD request, the Rate R is specified for a content component. If the Push-rate Directive is used with aggregation of all components associated with a MPD request, the Rate R is specified for individual content components of all components associated with the MPD request. The server may acknowledge and send back the Push-rate Directive to the client to indicate to the client that a selected data sending rate for next one or more groups of data for the media data requested is no less than the Rate R. The Rate R can be calculated as a sum of a currently requested content data rate, network uncertainty and an else other factor in one embodiment. The server may calculate a sending rate based on information including the Rate R and network dynamics, and pushes the groups of data for the media data requested according to the sending rate.

Another method and system of message exchange for controlling flow associated with multimedia streaming services from a server to a client using HTTP are disclosed. According to this method, a MPD request is sent from a client to a server to request a media service. One or more MPD fragments are sent by the server in response to the MPD request from the client. Each MPD fragment corresponds to one fragmented MPD that comprises one MPD header, one MPD payload, one Period header, one Period payload, or a combination thereof, and at least one fragmented MPD omits one MPD header, one MPD payload, one Period header or one Period payload. One or more groups of data for media data associated with said one or more MPD fragments are sent from the server to the client. The client then plays back the groups of data for the media data received.

The new MPD attribute @CurrentMediaPresentationDuration for a current MPD fragment can be signalled to indicate a use of the fragmented MPD, where the new MPD attribute specifies the duration of the current MPD fragment. When MPD@type is equal to "dynamic", the server may provide a MPD update in one MPD fragment. When MPD@type is equal to "static", an announced MPD from the server may correspond to a first MPD fragment and the first MPD fragment is used as Root MPD. Extended description for element Location associated with the new MPD attribute can be used by a content author or the server as an indication to where said one or more MPD fragments are available. The fragmented MPD can be used by a content author or the server to editing, Ad insertion, controlled playback or a combination thereof by using the fragmented MPD with other controlled playback description or enforcement for flexible control granularities on a MPD fragment basis. The fragmented MPD can also be used by a content author or the server to initially offer one or more MPD fragments with a limited number of segment content descriptions in terms of video lengths.

Yet another method and system of message exchange for controlling flow associated with multimedia streaming services from a server to a client using SAND (Server and network assisted DASH are disclosed. According to this method, one or more status messages are sent from a DASH client to one or more DANEs (DASH aware network elements) to indicate status of the DASH client, where the status message belongs to a status message group including SharedResourceAllocation message comprising parameters including bandwidth and pacingRate. A bandwidth value associated with parameter bandwidth can be computed from MPD (Media Presentation Description) by summing bandwidths of all components that the DASH client uses, and a pacing-rate value associated with parameter pacingRate can be a data delivery rate that the DASH client expects to receive media data at the pacing-rate value.

BRIEF DESCRIPTION OF DRAWINGS

FIG. 3 illustrates an example of MPD file for on-demand video streaming using MPEG-2 TS.

FIG. 4 illustrates an example of fragmented MPD with only the MPD Header according to an embodiment of the present invention.

FIG. 5 illustrates an example of fragmented MPD with only the MPD Payload according to an embodiment of the present invention.

FIG. 6 illustrates an example of fragmented MPD with only the Period Header according to an embodiment of the present invention.

FIG. 7 illustrates an example of fragmented MPD with only the Period Payload according to an embodiment of the present invention.

DETAILED DESCRIPTION

Figure 1:
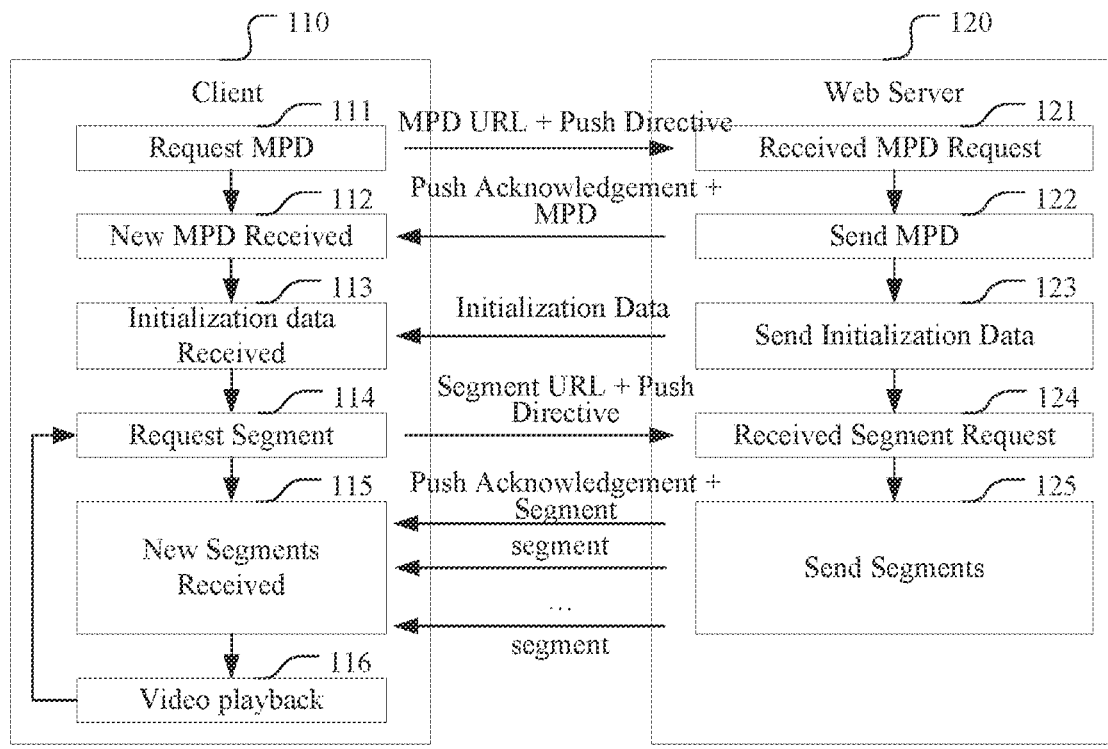
FIG. 1 illustrates an example of the overall flow of video streaming using server push, where a set of communication procedures are used between the server and the client to facilitate media streaming.
Figure 2:
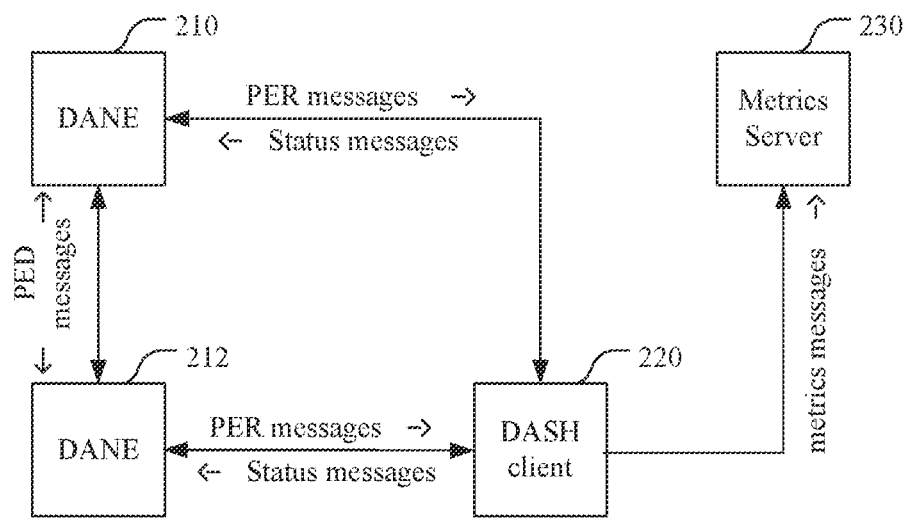
FIG. 2 illustrates an example of message exchange between a DASH (Dynamic Adaptive Streaming over HTTP) client and DANEs (DASH Aware Network Elements).

The following description is of the best-contemplated mode of carrying out the invention. This description is made for the purpose of illustrating the general principles of the invention and should not be taken in a limiting sense. The scope of the invention is best determined by reference to the appended claims.

By the nature of request/response in HTTP 1.1, the streaming rate pacing or App level flow control may be on the client side. DASH clients with intelligence should use network bandwidth efficiently by requesting segment data in terms of needs and consumption rates by media engines. However, when server Push is used in DASH streaming with Part 6 (i.e., "Working Draft for 23009-6: DASH over Full Duplex HTTP-compatible Protocols (FDH)", N15685, October 2015, Geneva, Switzerland), due to no Push Directive indicating the pushing rate that a client would like to have the server use, a DASH client may lose or partially lose the rate pacing or App level flow control after issuing a request with Push strategies. For example, a client sends segment request with Push Directive of Push-next k segments, then it is up to the server to send next k segments at an unspecified rate for a given stream and a connection, although it may be capped by the HTTP protocol flow control if applicable.

Using the server Push may save many HTTP requests and network round trip time; it would be beneficial to have a rate pacing or App level flow control mechanism to optimize the usage of network resources. The present invention discloses a new Push Directive that can be added to the current working draft of Part 6 to allow a client to specify a pushing rate for a stream or a connection on top of the protocol level flow control in HTTP/2 or Web Socket Protocol.

The disclosed new Push Directive uses the same format in the ABNF (Augmented Backus-Naur Form) form in the working draft as: PUSH DIRECTIVE=PUSH_TYPE "," PUSH_PARAMS The new Push Directive type is "urn:mpeg:dash:fdh:2016:push-rate" and the Push Directive parameter is "R", e.g., number of bytes per second. Generally, R is defined as a minimum sending data size over a time window on a stream in a given network (e.g. TCP) connection. It implies that at this push rate there will be sufficient data for a requesting client to consume. A DASH server may choose to use a sending rate O to push data as a response to the Push-rate request, where O>=R. R may be specified for a content component if the Push-rate Directive is used with a component request, or as aggregation of all components with a MPD request and etc. The aggregation may be in a vector form such as [$R_1$, $R_2$, $R_3$], where $R_1$, $R_2$ and $R_3$ may correspond component 1, component 2 and component 3, such as video, audio and text data, respectively. An exemplary Push Directive according to an embodiment of the present invention is shown in Table 1, where the new Push Directive type is added to other existing Push Directive types with valid values for PushDirective of the working draft as below.

TABLE 1

| PushType | PushParams | Description |
|---|---|---|
| urn:mpeg:dash:fdh:2016:push-rate | R:Number | Indication that it is sufficient at this push rate. If R is not present or a value of 0 means that the server may elect to push in terms of network protocol settings. A server receiving such push directive may push next segments to the requested one at a rate no less than R. R may be specified for a content component if it is used with a component request, or as aggregation of all components with a MPD request that R may be in a vector form such as [$R_1$, $R_2$, $R_3$] for component 1, component 2 and component 3. A client receiving such push directive is informed that server intends to push the next segments at a rate no less than R. |

In other words, as a suggested parameter or hint, R may be used by a DASH server as the lower bound of sending rate without considering other factors for a just-in-time delivery, which means a DASH client would have sufficient data for a possible smooth representation playout if the server pushes data at least at this rate R. A conforming DASH server should respect such a setting and request to work with the DASH client for achieving a desired rate pacing or App level flow control.

To apply the proposed Push-rate Directive to DASH streaming services, a DASH client may consider using network statistics, current data rate and other information from client's perspective to generate a Push rate R as a summation of various rates or equivalence:

$$R=R_d+R_u+R_e \quad (1)$$

In the above equation, $R_d$ is the currently requested content data rate, $R_u$ is network uncertainty, such as estimation error of network stats, and $R_e$ is an "else other factor", such as unpredictable risk. R is relevant to the range specified by the Push-time, Push-next, or Push-template Directive. When there is representation switching indicated in the range, $R_d$ may be set to the maximum data rate of the corresponding representations in the range.

When a DASH server receives the Push-rate directive with a specified pushing rate R, it may consider calculating requested data size or recording pushed data segment size over the corresponding time window to operate at the sending rate O that may be calculated in a similar way as a summation of various rates or equivalence:

$$O=+R_r+R_n+R_s+R_o \quad (2)$$

In the above equation, $R_r$ is calculated or recorded data rate; $R_n$ is a rate reflecting network dynamics from server's perspective, such as packetization overhead; $R_s$ is an offset based on the received rate R, such as $R=R_d+R_s$; and $R_o$ is an offset based on network protocol settings for flow control rate $R_p$, such as $R_p=R+R_n+R_o$. For trusted and conforming DASH client and server, $T_f$ and $R_d$ are equivalent so that R can be represented as $$R=R_f+R_s.$$

Accordingly, equation (2) can be written as $$O=R+R_n+R_0. \quad (3)$$

The sending rate O is bounded by $R \leq O \leq R_p$. Therefore, a DASH server may choose O as the data Push rate to respond to a DASH client request.

In an embodiment, the current content data rate $R_d$ is known to a DASH client by parsing the received MPD file. The network uncertainty $R_u$ may be set to 3% of $R_d$; the else other factor $R_e$ may be set to another 2% of $R_d$; and the Push rate R becomes $$R=R_d+R_d \cdot 5\%=R_d \cdot 105\%.$$

As a special case, R may be set to equal to $R_d$.

In another embodiment, for a DASH server, $R_r$ may be calculated on the fetched data file sizes or the recorded push data sizes. The obtained $R_r$ is necessary to ensure the server operating at the promised rate $O \geq R$. $R_n$ may be set to 8% of $R_r$, or R. $R_o$ in equation (3) may be set to 0 to maximize the performance of the proposed method. Thus, it may yield $$O=R+R \cdot 8\%=R \cdot 108\%.$$

Usually a DASH server may be able to build a better multiplexing scheme based on the Push rate information. By doing so in terms of the proposed method in the present invention, the benefits are twofold. In addition to the imposed rate pacing or App level flow control on a DASH server to optimize usage of network resource within or across connections, a DASH client may change the Push strategies including adjusting the push rate R, and/or can even cancel the server Push in a timely fashion before it receives too much "not-yet-needed" data that would happen if not using the proposed method in present invention. The latter further helps to optimize the usage of network resources.

The present invention also discloses the use of MPD Fragmentation to improve the efficiency of using MPD. Various aspects of MPD Fragmentation are disclosed as follows.

MPD Fragmentation

In one aspect of this invention, a fragmented MPD file is specified to support the above mentioned features for more flexible and personalized services. It can be used in on-demand applications and live streaming service as well. Additional benefits will also be discussed in this invention. A conventional MPD file always includes full descriptions related to the associated media data.

Using network terminology, a MPD file can be treated as two parts: MPD Header and MPD Payload with identification as MPD@id. Hierarchically, the MPD consists of multiple serialized Period Header and Period Payload identified by each Period@id. A fragment of MPD is designed to include one or a combination of the following headers and payloads:

MPD Header
MPD Payload
Period Header
Period Payload

In a sense, newly received changes or additions by a client are tracked with a @id. Previously received MPD Header or Period Head holds for use unless a new one is received. Typically, Period Payload may include one or more Adaptation Sets.

FIG. 3 illustrates an exemplary MPD file for on-demand video streaming using MPEG-2 TS, which includes a full length file of MPD with MPD Header and MPD Payload. The conventional file includes all necessary information related to the media data. According to the terms MPD Header, MPD payload, Period Header and Period Payload introduced above for the present invention, the equivalent MPD fragments are identified for the conventional MPD file in FIG. 3. For examples, these lines corresponding to the MPD Header are identified by reference number 310. These lines corresponding to the Period Header are identified by reference number 320. These lines corresponding to the Period Payload are identified by reference number 330. These lines corresponding to the MPD Payload are identified by reference number 340. As shown in FIG. 3, the payload for Period may be part of the MPD payload.

The fragmented MPD may be in one of the combinations as shown in FIG. 4 to FIG. 7, respectively. In FIG. 4, the fragmented file only contains MPD Header. In FIG. 5, the fragmented file only contains MPD Payload. In FIG. 6, the fragmented file only contains Period Header. In FIG. 7, the fragmented file only contains Period Payload. The first MPD of content with MPD Header may be considered as the root MPD for the content.

Note @id for each level of MPD, Period, and Adaptation Set is present for client to track the MPD relevance for every single fragmented MPD file that it receives. In this way, a client should be able to append or assemble the received MPD fragments to a normal full length of MPD file as in the current standard if it chooses to do so.

Signalling and Usage for Fragmented MPD Files

In the current standard, for MPD@type="dynamic", the MPD element Location specifies a location of the MPD. The MPD element Location may be present with minOccurs="0" or maxOccurs="unbounded". Presence of the attribute MPD@minimumUpdatePeriod is an indication that update to the MPD is expected and restricted by the time setting in the sense that it may have several evolving versions of the MPD within the live service duration; otherwise, no update to the MPD is expected. For MPD@type="static", the MPD element Location, @minimumUpdatePeriod, and other related settings are to be ignored since the given MPD is available for the whole content. A method is described for signalling and usage for fragmented MPD files as follows.

A new attribute is defined as "@CurrentMediaPresentationDuration" for use of the fragmented MPD format. The existing elements and attributes in the standard can be used along with extended descriptions. These modifications can be added to Table 3—Semantics of MPD Element in subsection 5.3.1.2 of ISO/IEC 23009-1. An exemplary modification is shown in Table 2 below.

TABLE 2

| Element or Attribute Name | Use | Description |
| --- | --- | --- |
| @currentMediaPresentation Duration | Optional | specifies the duration of the current Media Presentation fragment duration. This attribute shall be present for using the fragmented MPD format. A value 0 means the current MPD only has update to MPD Header or Period Header. |
| Location | 0 . . . N | specifies a location at which the MPD is available This element shall be present for a MPD fragment when @currentMediaPresentationDuration is present. |

For live services, all elements and attributes for MPD@type="dynamic" are applicable as they are with the availability and minimum update period. When @currentMediaPresentationDuration is present, the content author and server offer a MPD update as a MPD fragment (Header, Payload, or both) to the prior MPD fragments. In this way, per @minimumUpdatePeriod, a client may efficiently send a request for the change on the previous ones instead of a new version of the previous MPD that may grow bigger with time. After the live event ends, the content author or the server may choose to assemble the MPD fragments into a full MPD as specified in the current standard.

For on-demand services, MPD@type="static", the fragmented MPD is signalled when @currentMediaPresentationDuration is present. In this case, the server announced MPD is the first MPD fragment, so called Root MPD. A client may request a MPD fragment starting from requesting Root MPD.

Examples of Fragmented MPD

Examples of fragmented MPD according to embodiments of the present invention are shown below.

1. Control of Exposure Level of MPD

A content author or server may decide using the element Location to "relay" the MPD fragments at different exposure levels. The content author or server may choose to expose MPD fragments in Root MPD or to expose MPD fragments as a linked list. Alternatively, the content author or server may expose MPD fragments in Root MPD as well as expose MPD fragments as a linked list. The MPD fragment at Location being a full MPD as specified in the current standard is considered as a special case. In this way, the exposure level of MPD to client may be under the control of content author or server with various purposes.

2. Editing, Ad Insertion and Controlled Playback Behaviour

A content author or server may use the fragmented MPD to create more opportunities for the purpose of editing and Ad (i.e., Advertisement) insertion. The fragmented MPD may be used with other controlled playback description and enforcement for flexible control granularities for supporting trick play and Ad insertion. For instance, each MPD fragment may be assigned with a playback rule from the controlled playback description. The assigned rules may be changed on a MPD fragment basis. In addition, a server may limit a trick play with the levelled exposure of MPD fragments.

3. Consideration of Abandonment Rate

Statistically, after clicking 'play,' roughly 6% of the audience departs every second. After only 5 to 10 seconds, a mere 80% of viewers remain. Such an abandonment rate is related to the length of videos. Shorter videos are often more engaging than longer videos. The average 30-second video is viewed 85% of the way through, while the average 2-minute to 10-minute video is viewed on average 50% of the way through. The abandonment rate increases along with video length in general.

Given the above statistics, a content author or streaming server may use the fragmented MPD initially to offer a MPD fragment with a limited number of segment content descriptions in terms of video lengths according to an embodiment of the present invention. In some cases, a MPD file may be large when the segment template is not in use. Thus it may help optimize network resources in the sense that clients may not need to fetch the full length MPD.

4. Server Push by Parsing a MPD Fragment

HTTP server push is supported in HTTP/2 ("*Hypertext Transfer Protocol Version* 2 (*HTTP/2*)", IETF RFC 7540, May 2015) or HTTP 1.1 with WebSocket upgrade ("*The WebSocket Protocol*", IETF RFC 6455, December 2011). The mechanism is that the server can send unsolicited data to a client. It may save many HTTP requests and network round-trip time. The working draft for 23009-6 specifies carriage of MPEG-DASH media presentations over full duplex HTTP-compatible protocols, particularly HTTP/2 and WebSocket. With the fragmented MPD, plus some HTTP hints or Push Directive (e.g., a Push Directive indicating data rate or segment IDs), a DASH server with the MPD parsing functionality may sort out metadata in the MPD fragment and push the related content segments along with the MPD requested by a client before the client explicitly requests the segments in the MPD fragment.

In the SAND Status Messages specified in the current standard, the SharedResourceAllocationmessage groups all information allowing a DASH client to indicate to one or more DANE(s) the intent to share network resources (e.g. access link bandwidth in a home network) as shown in Table 3, which corresponds to Table 5 of "Text of ISO/IEC FDIS 23009-5 Server and Network Assisted DASH", W16230, June 2016, Geneva, Switzerland.

TABLE 3

| Parameter | Type | Cardinality | Description |
| --- | --- | --- | --- |
| SharedResourceAllocation | object | 1 | |
| operationPoints | array | 1 . . . N | List of suitable operation points for current play time. |
| bandwidth | integer | 1 | A bandwidth value expressed in a number of bits per second. This value should be computed from the MPD by summing bandwidths of all components the client would use for working at this operation point. If playback rate is not 1, this bandwidth value shall be modified accordingly. |
| quality | integer | 0 . . . 1 | An optional value describing the quality of the current operation point. |
| minBufferTime | integer | 0 . . . 1 | An optional value in milliseconds extracted from the MPD regarding a minimal buffer time of the current operation point. |
| weight | integer | 0 . . . 1 | A user allocated optional value which indicates a weight of the request in the present message for the resource allocation process. The exact use of this value depends on the allocation strategy indicated by allocationStrategy. |
| allocationStrategy | urn | 0 . . . 1 | An optional identifier to indicate the resource allocation strategy preferred by the client for resource sharing. See Annex C. If absent the value urn:mpeg:dash:sand:allocation:basic:2016is assumed. |
| mpdUrl | url | 0 . . . 1 | If present, an URL to the MPD related to the present message. |

A pacing rate parameter is disclosed in the present invention. The pacing rate parameter can be used to indicate the rate that the client would expect to receive contents for working at the related operating point. An example of text changes to support the present invention based on Table 5 of W16230 is shown in Table 4, where the added texts are shown in Italic.

TABLE 4

| Parameter | Type | Cardinality | Description |
| --- | --- | --- | --- |
| SharedResourceAllocation | object | 1 | |
| ... | ... | ... | ... |
| bandwidth | integer | 1 | A bandwidth value expressed in a number of . . . |
| pacingRate | | 1 | A pacing rate value expressed in a number of bits per second. This value should be larger than parameter 'bandwidth' and the client would expect to receive data at this pacing rate. |
| quality | integer | 0 . . . 1 | An optional value describing the quality of . . . |
| ... | ... | ... | ... |
| ... | ... | ... | ... |

The parameter 'pacingRate', on top of parameter 'bandwidth', expresses the client status of either the access link or preference on the data delivery rate. The DANEs should use this status information for rate pacing for the service to optimize networks and quality of services.

Figure 8:
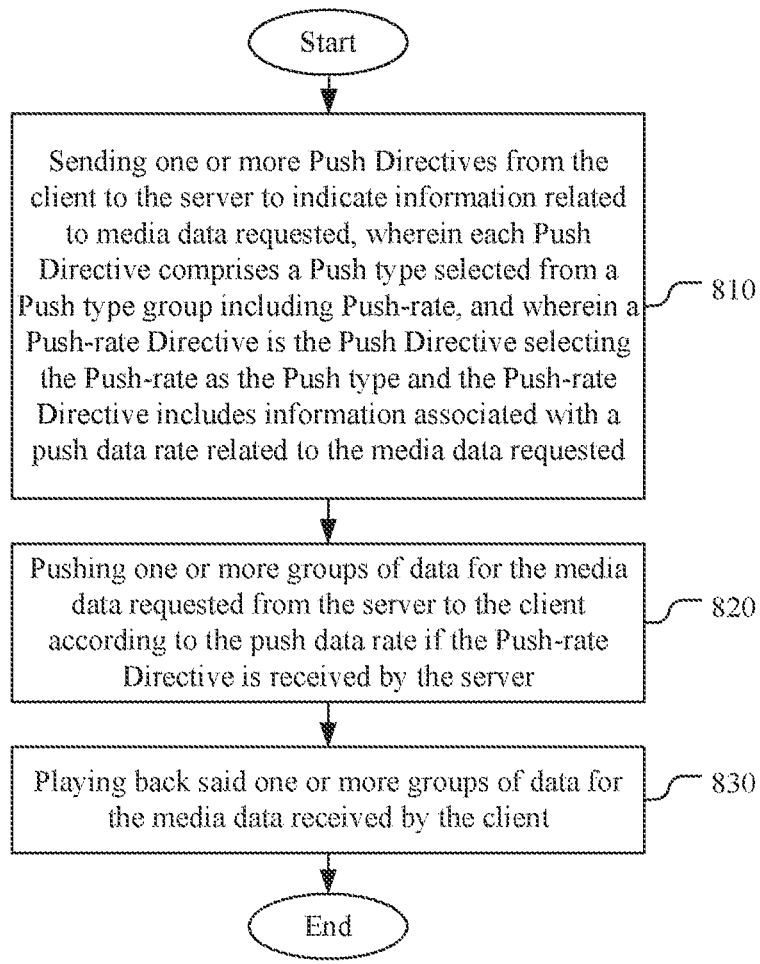
FIG. 8 illustrates an exemplary flowchart for a system incorporating message exchange for controlling flow associated with multimedia streaming services from a server to a client using DASH (Dynamic Adaptive Streaming over HTTP (Hypertext Transfer Protocol)) according to an embodiment of the present invention.

FIG. 8 illustrates an exemplary flowchart for a system incorporating message exchange for controlling flow associated with multimedia streaming services from a server to a client using DASH (Dynamic Adaptive Streaming over HTTP (Hypertext Transfer Protocol)) according to an embodiment of the present invention. The steps shown in the flowchart may be implemented as program codes executable on one or more processors (e.g., one or more CPUs) at the server side and the client side. The steps shown in the flowchart may also be implemented based hardware such as one or more electronic devices or processors arranged to perform the steps in the flowchart. According to this method, one or more Push Directives are sent from a client to a server to indicate information related to media data requested in step 810, where each Push Directive comprises a Push type selected from a Push type group including Push-rate, wherein a Push-rate Directive is the Push Directive selecting the Push-rate as the Push type and the Push-rate Directive includes information associated with a push data rate related to the media data requested. In step 820, the server pushes one or more groups of data for the media data requested to the client according to the push data rate if the Push-rate Directive is received by the server. The client plays back said one or more groups of data for the media data received in step 830.

Figure 9:
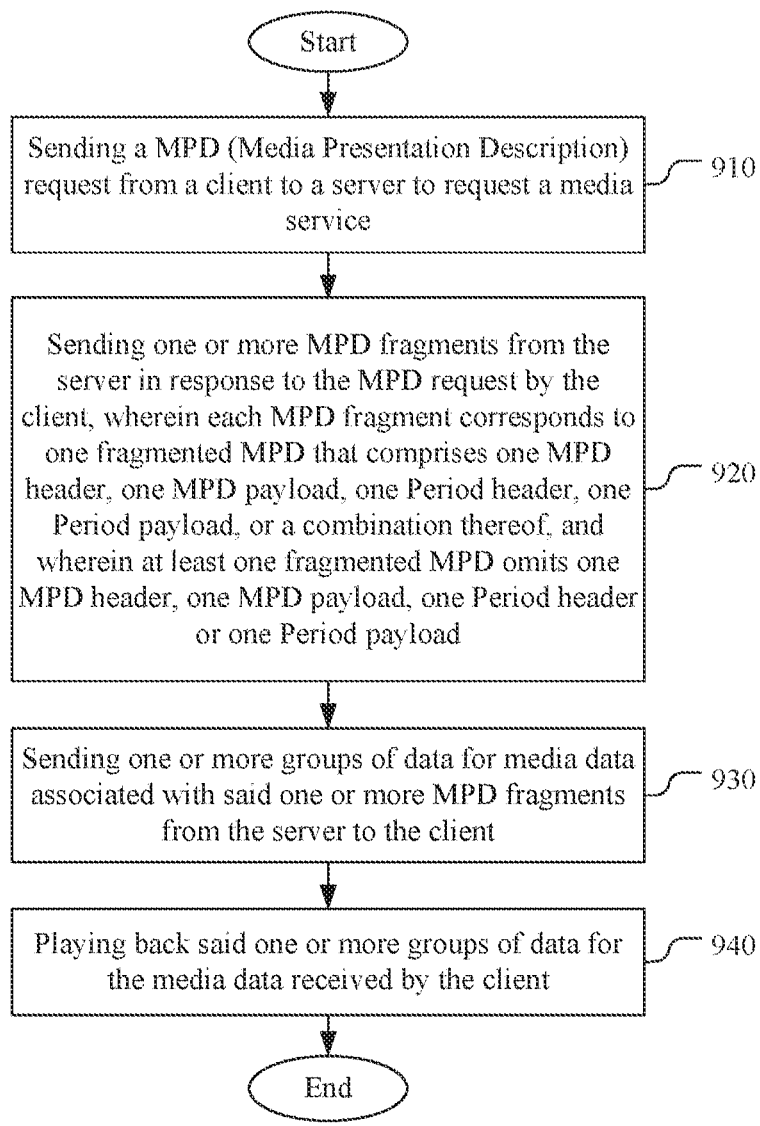
FIG. 9 illustrates an exemplary flowchart for a system incorporating message exchange for controlling flow associated with multimedia streaming services from a server to a client using HTTP (Hypertext Transfer Protocol) according to an embodiment of the present invention.

FIG. 9 illustrates an exemplary flowchart for a system incorporating message exchange for controlling flow associated with multimedia streaming services from a server to a client using HTTP (Hypertext Transfer Protocol) according to an embodiment of the present invention. The steps shown in the flowchart may be implemented as program codes executable on one or more processors (e.g., one or more CPUs) at the server side and the client side. The steps shown in the flowchart may also be implemented based hardware such as one or more electronic devices or processors arranged to perform the steps in the flowchart. According to this method, a MPD (Media Presentation Description) request is sent from a client to a server to request a media service in step 910. One or more MPD fragments from the server in response to the MPD request by the client, wherein each MPD fragment corresponds to one fragmented MPD that comprises one MPD header, one MPD payload, one Period header, one Period payload, or a combination thereof in step 920, and where at least one fragmented MPD omits one MPD header, one MPD payload, one Period header or one Period payload. One or more groups of data for media data associated with said one or more MPD fragments are sent from the server to the client in step 930. The client plays back said one or more groups of data for the media data received in step 940.

Figure 10:
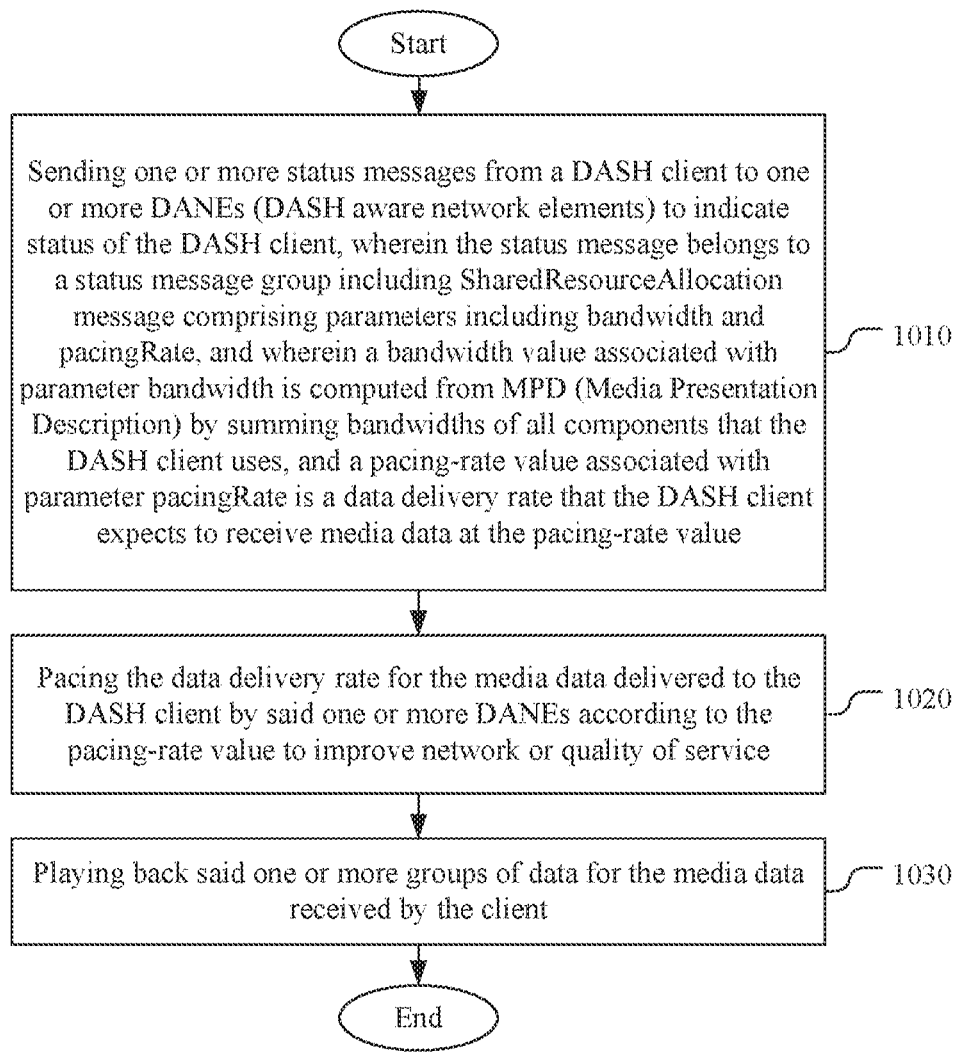
FIG. 10 illustrates an exemplary flowchart for a system incorporating message exchange for controlling flow associated with multimedia streaming services from a server to a client using SAND (Server and network assisted DASH (Dynamic Adaptive Streaming over Hypertext Transfer Protocol)) according to an embodiment of the present invention.

FIG. 10 illustrates an exemplary flowchart for a system incorporating message exchange for controlling flow associated with multimedia streaming services from a server to a client using SAND (Server and network assisted DASH (Dynamic Adaptive Streaming over Hypertext Transfer Protocol)) according to an embodiment of the present invention. The steps shown in the flowchart may be implemented as program codes executable on one or more processors (e.g., one or more CPUs) at the server side and the client side. The steps shown in the flowchart may also be implemented based hardware such as one or more electronic devices or processors arranged to perform the steps in the flowchart. According to this method, one or more status messages are sent from a DASH client to one or more DANEs (DASH aware network elements) to indicate requested status of the DASH client in step 1010, where the status message belongs to a status message group including SharedResourceAllocation-message comprising parameters including bandwidth and pacingRate. A bandwidth value associated with parameter bandwidth is computed from MPD (Media Presentation Description) by summing bandwidths of all components that the DASH client uses and a pacing-rate value associated with parameter pacingRate is a data delivery rate that the DASH client expects to receive media data at the pacing-rate value. One or more DANEs pace the data delivery rate for the media data delivered to the DASH client according to the pacing-rate value to improve network or quality of service in step 1020. The client plays back said one or more groups of data for the media data received in step 1030.

The flowchart shown above is intended to illustrate examples of messaging between a server and a client for media streaming incorporating embodiments of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of message exchange for controlling flow associated with multimedia streaming services from a server to a client using SAND (Server and network assisted DASH (Dynamic Adaptive Streaming over Hypertext Transfer Protocol)), the method comprising:
   sending one or more status messages from a DASH client to one or more DANEs (DASH aware network elements) to indicate status of the DASH client, wherein the status message belongs to a status message group including SharedResourceAllocationmessage comprising parameters including bandwidth and pacingRate, and wherein a bandwidth value associated with parameter bandwidth is computed from MPD (Media Presentation Description) by summing bandwidths of all components that the DASH client uses, and a pacing-rate value associated with parameter pacingRate is a data delivery rate that the DASH client expects to receive media data at the pacing-rate value;
   pacing the data delivery rate for the media data delivered to the DASH client by said one or more DANEs according to the pacing-rate value to improve network or quality of service; and
   playing back the media data received by the DASH client.

2. A system for providing media services using SAND (Server and network assisted DASH (Dynamic Adaptive Streaming over Hypertext Transfer Protocol)), the system comprising:
   at least one DANE (DASH aware network element) to provide media data, wherein each DANE includes one or more first processors;
   at least one DASH client device to receive the media data, wherein each DASH client device includes one or more second processors;
   wherein said one or more first processors and said one or more second processors are configured to:
   send one or more status messages from said at least one DASH client device to said at least one DANE to indicate requested status of said at least one DASH client device, wherein the status message belongs to a status message group including SharedResourceAllocationmessage comprising parameters including bandwidth and pacingRate, and wherein a bandwidth value associated with parameter bandwidth is computed from MPD (Media Presentation Description) by summing bandwidths of all components that said at least one DASH client device uses, and a pacing-rate value associated with parameter pacingRate is a data delivery rate that said at least one DASH client device expects to receive media data at the pacing-rate value;
   pace the data delivery rate for the media data delivered to said at least one DASH client device by said at least one DANE according to the pacing-rate value to improve network or quality of service; and
   play back the media data received by said at least one DASH client device.

* * * * *